(12) United States Patent
Tamma et al.

(10) Patent No.: US 9,991,930 B2
(45) Date of Patent: Jun. 5, 2018

(54) CONFIGURABLE CORRELATOR FOR JOINT TIMING AND FREQUENCY SYNCHRONIZATION AND DEMODULATION

(71) Applicant: NXP USA, Inc., Austin, TX (US)

(72) Inventors: Raja Venkatesh Tamma, Leander, TX (US); Justin A. Fritz, Austin, TX (US); Mihai-Ionut Stanciu, Bucharest (RO)

(73) Assignee: NXP USA, Inc., Austin, TX (US)

(*) Notice: Subject to any disclaimer, the term of this patent is extended or adjusted under 35 U.S.C. 154(b) by 0 days. days.

(21) Appl. No.: 15/667,962

(22) Filed: Aug. 3, 2017

(65) Prior Publication Data

US 2017/0359098 A1 Dec. 14, 2017

Related U.S. Application Data

(62) Division of application No. 14/960,784, filed on Dec. 7, 2015, now Pat. No. 9,729,195.

(30) Foreign Application Priority Data

Oct. 5, 2015 (RO) .............................. A 2015 00716

(51) Int. Cl.
*H04B 1/00* (2006.01)
*H04B 1/709* (2011.01)
*H04L 25/02* (2006.01)

(52) U.S. Cl.
CPC ......... *H04B 1/709* (2013.01); *H04L 25/0226* (2013.01)

(58) Field of Classification Search
CPC ... H04L 27/2675; H04L 5/0048; H04L 7/042; H04L 25/0224; H04L 2027/0026; H04L 25/02; H04L 25/0226; H04B 1/709
See application file for complete search history.

(56) References Cited

U.S. PATENT DOCUMENTS

| | | |
|---|---|---|
| 5,966,411 A | 10/1999 | Struhsaker |
| 6,134,286 A | 10/2000 | Chennakeshu et al. |
| 6,208,291 B1 | 3/2001 | Krasner |
| 7,082,286 B2 | 7/2006 | Kaewell, Jr. et al. |
| 7,203,254 B2 | 4/2007 | Carsello et al. |
| 7,269,233 B2 | 9/2007 | Shiung et al. |
| 8,018,378 B2 | 9/2011 | Sun et al. |
| 8,630,374 B2 * | 1/2014 | Roh .................... H04L 27/2071 370/392 |
| 8,644,426 B1 | 2/2014 | Zhou et al. |
| 9,053,349 B1 | 6/2015 | White et al. |
| 2004/0146124 A1 | 7/2004 | Shiung |
| 2008/0205492 A1 | 8/2008 | Gorday et al. |
| 2016/0381581 A1 | 12/2016 | Stanciu et al. |

FOREIGN PATENT DOCUMENTS

EP 0785647 A1 7/1997

* cited by examiner

*Primary Examiner* — Rahel Guarino

(57) ABSTRACT

At least one embodiment of a correlator comprising a plurality of correlator taps is configurable to provide synchronization and symbol modulation for a plurality of modulation systems. Among other uses, at least one embodiment of the correlator can provide a coarse symbol timing value. In response to determining the coarse symbol timing value, a receiver can receive a signal. Among other uses, at least one embodiment of the correlator can provide a carrier frequency offset (CFO) estimate. In response to determining the CFO estimate, a receiver can receive a signal.

16 Claims, 7 Drawing Sheets

CONFIGURABLE CORRELATOR FOR JOINT TIMING AND FREQUENCY SYNCHRONIZATION AND DEMODULATION

RELATED APPLICATION

This application is a divisional of co-pending U.S. patent application Ser. No. 14/960,784, filed on Dec. 7, 2015.

CROSS REFERENCE TO RELATED APPLICATION(S)

The present application claims priority to Romanian Patent Application No. RO A 2015 00716, entitled "CONFIGURABLE CORRELATOR FOR JOINT TIMING AND FREQUENCY SYNCHRONIZATION AND DEMODULATION," filed on Oct. 5, 2015, the entirety of which is herein incorporated by reference.

BACKGROUND

Field of the Disclosure

The present application relates generally to signal processing systems and more specifically to correlators.

Background of the Disclosure

Correlators are used in signal processing to identify and recover a desired signal in the presence of noise. Correlators determine the existence of a correlation between a received signal and at least one locally generated signal. Since the locally generated signal can be made to have characteristics similar to those of possible portions of the desired signal, a close correlation between the received signal and locally generated signal can identify the presence of, and therefore recover, the corresponding possible portion of the desired signal.

The signals of different communications protocols can have different characteristics. Therefore, incompatibly different correlators are often needed for different communications protocols. The need for incompatibly different correlators imposes cost, size, and complexity requirements on products incorporating the incompatibly different correlators.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
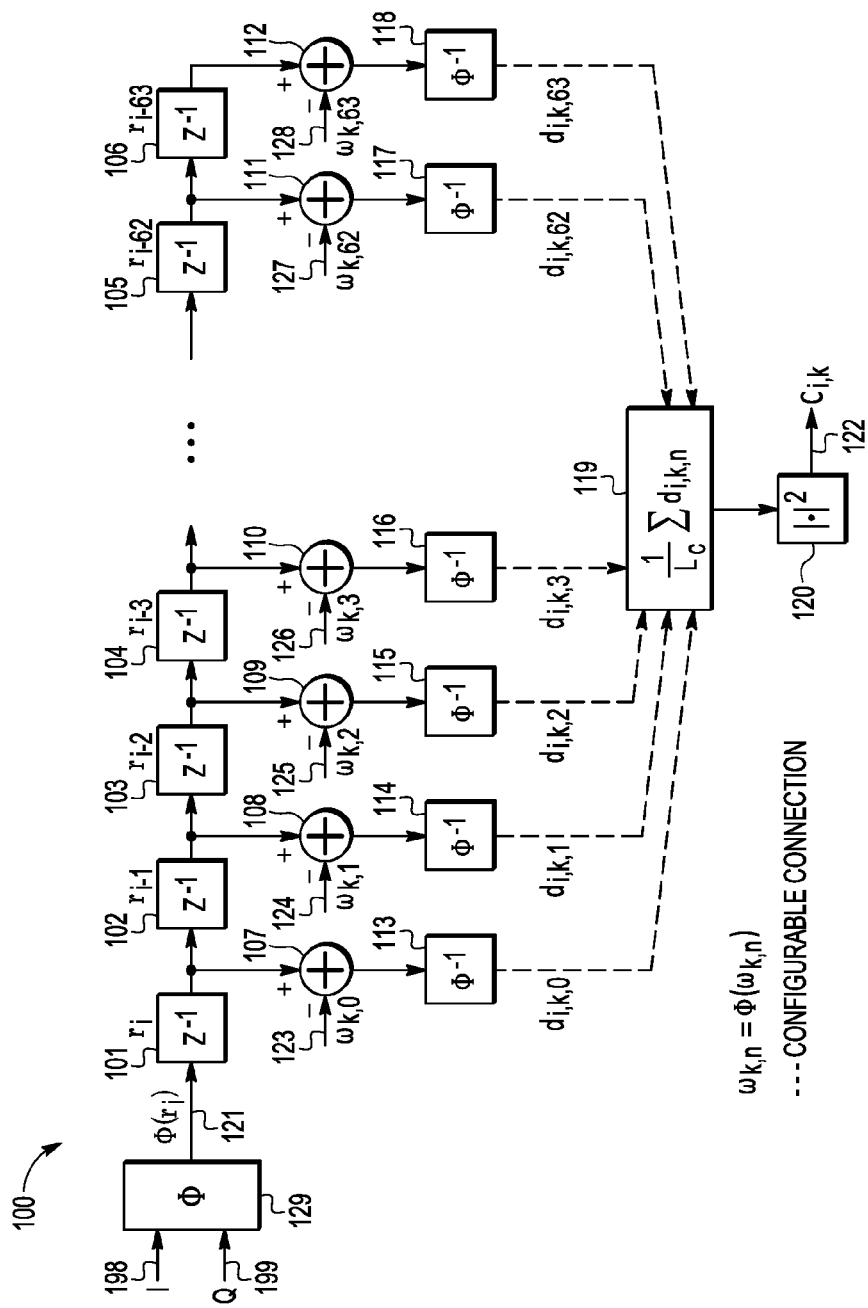
FIG. 1 is a block diagram illustrating a general form of a configurable correlator configurable for timing and frequency synchronization and demodulation of multiple types of signals modulated according to different modulation schemes in accordance with at least one embodiment.

A configurable correlator is disclosed that comprises a plurality of correlator taps in succession. The correlator taps can be configured as a single unit to provide time and frequency synchronization and demodulation, for example, in the case of direct sequence spread spectrum (DSSS), or a subset of the correlator taps can be configured as a synchronization unit to provide time and frequency synchronization while a different subset of the correlator taps is configured as a demodulation unit to provide demodulation, for example, in the case of continuous phase frequency shift keying (CPFSK). Within each configured unit, a delay is introduced between each successive correlator tap, allowing each correlator tap to operate with respect to a different point in time. Each correlator tap compares a sample of a received signal, as delayed according to the correlator tap's position, with a sample of a reference waveform, as similarly delayed. The comparisons (e.g., differences between the samples of the received signal and the samples of the reference waveform) are added together to produce a sum. A correlation value is obtained based on the sum and provided at the correlator output. As an example, the correlation value can be based on an absolute value of the sum. As another example, the sum or the absolute value of the sum is squared to produce a correlation value at the correlator output. The correlation value allows proper reception of the received signal, including synchronization and demodulation.

By implementing the configurable correlator in the phase domain, complicated operations that require more processing capability can be avoided. Such an implementation is suitable for constant envelope modulations or when no amplitude modulation is used to convey the information to be received. Accordingly, such an implementation can be used for receiving CPFSK signals and DSSS signals, such as DSSS signals in accordance with IEEE 802.15.4 specifications. For received signals that are not in the phase domain, such as in-phase and quadrature (I, Q) representations of frequency domain baseband received signals, such signals can be converted to phase domain representations. The phase domain representations are provided to delay units to introduce delay between the successive correlator taps. After the comparisons with the samples of the reference waveform are performed, the differences can be converted from phase domain representations to I, Q representations to be provided to the adder, which produces the sum. As another example, the configurable correlator can be implemented in the complex domain, for example, using the I, Q representations. A complex domain implementation can be used with signals including signals exhibiting amplitude modulation either by itself or as a component of a more elaborate modulation technique. Instead of determining the differences between the phase domain representations and the samples of the reference waveform, a product of complex domain representations multiplied by the samples of the reference waveform can be determined.

The configurable correlator can be configured to receive communications according to different communication protocols by utilizing either all of the correlator taps of the configurable correlator as a whole or by utilizing subsets of the correlator taps for different purposes, such as time and frequency synchronization and demodulation. Not all of the correlator taps need be used for a particular configuration—some correlator taps may be left unused. For configurations that use subsets of correlator taps for different functions, correlator taps later in the delay sequence may be provided with a multiplexer to select direct application of a received signal that has not been delayed so the received signal need not traverse one subset to arrive at a second subset.

The configurable correlator is not limited to comparing samples of the received signal to a single reference waveform. Rather, a plurality of reference waveforms can be compared to the samples of the received signal. For example, several reference waveforms each representative of a different carrier frequency offset (CFO) can be compared to the samples of the received signal. Thus, if the received signal differs from a nominal carrier frequency, an appropriate carrier frequency offset to compensate for the frequency difference can be identified by the configurable correlator. As an example, a configurable correlator can be operated at an operating frequency that is a multiple of a sampling frequency of the received signal wherein the multiple is the number of different CFO values to which the plurality of reference waveforms correspond.

A configurable correlator can be implemented by processing discrete time samples according to the following equation to provide a maximum likelihood (ML) estimation upon which determination of received symbols of a received digitally modulated signal may be made to implement a receiver to recover the information being communicated:

$$C_{i,k} = \left| \frac{1}{L_c} \sum_{n=0}^{L_c} \exp\{j(\Phi[r_{i-n}]] - \Phi[w_{k,n}])\} \right|^2, 0 \le k \le 7, \forall i$$

wherein i is a time index, k is a frequency index (with each value of k representing a corresponding CFO), $C_{i,k}$ is a correlation value, $L_c$ is a number of correlator taps, n is a tap index for the summation, j is the square root of negative one, $r_{i-n}$ is a time-delayed sample value, $\Phi$ is a function that converts to a phase domain, $\Phi[r_{i-n}]$ is a phase domain representation of a time-delayed received signal sample value, and $\Phi[w_{k,n}]=\omega_{k,n}$, which is a phase domain representation of a time-indexed and frequency-indexed (e.g., CFO-adjusted) reference waveform sample value. While k is shown as having values from zero to seven to provide evaluation of eight CFO candidate values, a configurable correlator may be implemented according to other ranges of k values. While the equation involves a difference of the phase-domain representation of the time-delayed received signal sample value and the phase-domain representation of the time-indexed and frequency-indexed reference waveform sample value, a product of a complex-domain representation of the time-delayed received signal sample and a complex-domain representation of the time-indexed and frequency-indexed reference waveform sample value could instead be used for a complex-domain implementation of a configurable correlator. Structures, such as those shown in FIGS. 1-3 and described below, and methods, such as those shown in FIGS. 4 and 5 and described below, can be implemented according to the above equation to provide a configurable correlator.

FIG. 1 is a block diagram illustrating a general form of a configurable correlator that is configurable for timing and frequency synchronization and demodulation of multiple types of signals modulated according to different modulation schemes in accordance with at least one embodiment. Examples of such multiples types of signals include spread spectrum signals and CPFSK signals. Configurable correlator 100 comprises a plurality of unit delay blocks 101-106, a plurality of adder blocks 107-112, a plurality of phase domain to I, Q domain blocks 113-118, a summer block 119, and a squaring block 120. The unit delay blocks 101-106, adder blocks 107-112, and phase domain to I, Q domain blocks 113-118 are among larger pluralities of such elements configured as successive correlator taps of configurable correlator 100. Each correlator tap comprises a respective unit delay block, adder block, and phase domain to I, Q domain block. For clarity, not all correlator taps are illustrated in FIG. 1. Input 121, which provides a phase domain representation of a complex baseband input signal, denoted as $\Phi(r_i)$, is coupled to an input of unit delay block 101. Unit delay block 101 performs a unit delay on $\Phi(r_i)$ to provide $\Phi(r_{i-1})$, which represents a sample of the phase domain representation of the complex baseband input signal delayed by one sampling time. An output of unit delay block 101, which provides $\Phi(r_{i-1})$, is coupled to an input of unit delay block 102 and to an additive input of adder block 107. Input 123, which provides a phase domain representation of a reference waveform against which the phase domain representation of the complex baseband input signal can be compared, denoted as $\omega_{k,0}$, is coupled to a subtractive input of adder block 107. Adder block 107 subtracts $\omega_{k,0}$ from $\Phi(r_{i-1})$ to provide a difference to an input of phase domain to I, Q domain block 113. Phase domain to I, Q domain block 113 performs conversion of the phase domain representation of the difference between the phase domain representation of the complex baseband input signal and the phase domain representation of the reference waveform to a complex (e.g., I, Q) representation of the difference and provides $d_{i,k,0}$, which represents the complex representation of the difference, to an input of summer block 119.

Unit delay block 102 receives $\Phi(r_{i-1})$ and performs a unit delay on $\Phi(r_{i-1})$ to provide $\Phi(r_{i-2})$, which represents a sample of the phase domain representation of the complex baseband input signal further delayed by another one sampling time. An output of unit delay block 102, which provides $\Phi(r_{i-2})$, is coupled to an input of unit delay block 103 and to an additive input of adder block 108. Input 124, which provides a phase domain representation of a reference waveform delayed by one sampling time, denoted as $\omega_{k,1}$, is coupled to a subtractive input of adder block 108. Adder block 108 subtracts $\omega_{k,1}$ from $\Phi(r_{i-2})$ to provide a difference to an input of phase domain to I, Q domain block 114. Phase domain to I, Q domain block 114 provides $d_{i,k,1}$, which represents the complex representation of the difference, to an input of summer block 119.

Unit delay block 103 receives $\Phi(r_{i-2})$ and performs a unit delay on $\Phi(r_{i-2})$ to provide $\Phi(r_{i-3})$, which represents a sample of the phase domain representation of the complex baseband input signal further delayed by another one sampling time. An output of unit delay block 103, which provides $\Phi(r_{i-3})$, is coupled to an input of unit delay block 104 and to an additive input of adder block 109. Input 125, which provides a phase domain representation of a reference waveform further delayed by another sampling time, denoted as $\omega_{k,2}$, is coupled to a subtractive input of adder block 109. Adder block 109 subtracts $\omega_{k,2}$ from $\Phi(r_{i-3})$ to provide a difference to an input of phase domain to I, Q domain block 115. Phase domain to I, Q domain block 115 provides $d_{i,k,2}$, which represents the complex representation of the difference, to an input of summer block 119.

Unit delay block 104 receives $\Phi(r_{i-3})$ and performs a unit delay on $\Phi(r_{i-3})$ to provide $\Phi(r_{i-4})$, which represents a sample of the phase domain representation of the complex baseband input signal further delayed by another one sampling time. An output of unit delay block 104, which provides $\Phi(r_{i-4})$, is coupled to an input of unit delay block 105 and to an additive input of adder block 110. Input 126, which provides a phase domain representation of a reference waveform further delayed by another sampling time, denoted as $\omega_{k,3}$, is coupled to a subtractive input of adder block 110. Adder block 110 subtracts $\omega_{k,3}$ from $\Phi(r_{i-4})$ to provide a difference to an input of phase domain to I, Q domain block 116. Phase domain to I, Q domain block 116 provides $d_{i,k,3}$, which represents the complex representation of the difference, to an input of summer block 119.

Additional correlator taps can exist between unit delay block 104 and unit delay block 105, depending on the number of correlator taps to be provided in any particular implementation. The outputs of the additional correlator taps can be provided to summer block 119. In the example illustrated in FIG. 1, 64 correlator taps are provided, not all of which need be used for any particular configuration of the configurable correlator. Other embodiments may be implemented with other numbers of correlator taps, including fewer than or more than 64 correlator taps.

Unit delay block 105 receives $\Phi(r_{i-62})$ at its input and performs a unit delay on $\Phi(r_{i-62})$ to provide $\Phi(r_{i-63})$, which represents a sample of the phase domain representation of the complex baseband input signal further delayed by another one sampling time. An output of unit delay block 105, which provides $\Phi(r_{i-63})$, is coupled to an input of unit delay block 106 and to an additive input of adder block 111. Input 127, which provides a phase domain representation of a reference waveform further delayed by another sampling time, denoted as $\omega_{k,62}$, is coupled to a subtractive input of adder block 111. Adder block 111 subtracts $\omega_{k,62}$ from $\Phi(r_{i-63})$ to provide a difference to an input of phase domain to I, Q domain block 117. Phase domain to I, Q domain block 117 provides $d_{i,k,62}$, which represents the complex representation of the difference, to an input of summer block 119.

Unit delay block 106 receives $\Phi(r_{i-63})$ at its input and performs a unit delay on $\Phi(r_{i-63})$ to provide $\Phi(r_{i-64})$, which represents a sample of the phase domain representation of the complex baseband input signal further delayed by another one sampling time. An output of unit delay block 106, which provides $\Phi(r_{i-64})$, is coupled to an additive input of adder block 112. Input 128, which provides a phase domain representation of a reference waveform further delayed by another sampling time, denoted as $\omega_{k,63}$, is coupled to a subtractive input of adder block 112. Adder block 112 subtracts $\omega_{i,k,63}$ from $\Phi(r_{i-64})$ to provide a difference to an input of phase domain to I, Q domain block 118. Phase domain to I, Q domain block 118 provides $d_{i,k,63}$, which represents the complex representation of the difference, to an input of summer block 119.

Correlation calculator block 119 performs a calculation to obtain a value based on the outputs of the several correlator taps and provides the value to squaring block 120. As an example, correlation calculator block 119 may be implemented using a summer block to add the complex representations of the differences of each correlator tap and to provide the sum to squaring block 120. Squaring block 120 squares the absolute value of the sum to provide a correlation value at output 122 to determine synchronization and demodulation. In accordance with at least one embodiment, a correlation value can be obtained based on the absolute sum from summer block 119 without squaring the absolute sum (e.g., squaring block 120 can be omitted). As used herein, the absolute sum is the absolute value of the sum. In accordance with at least one embodiment, a function that is a metric of the magnitude, such as a monotonic function based on the absolute value of the sum, can be used to provide a correlation value.

Figure 2:
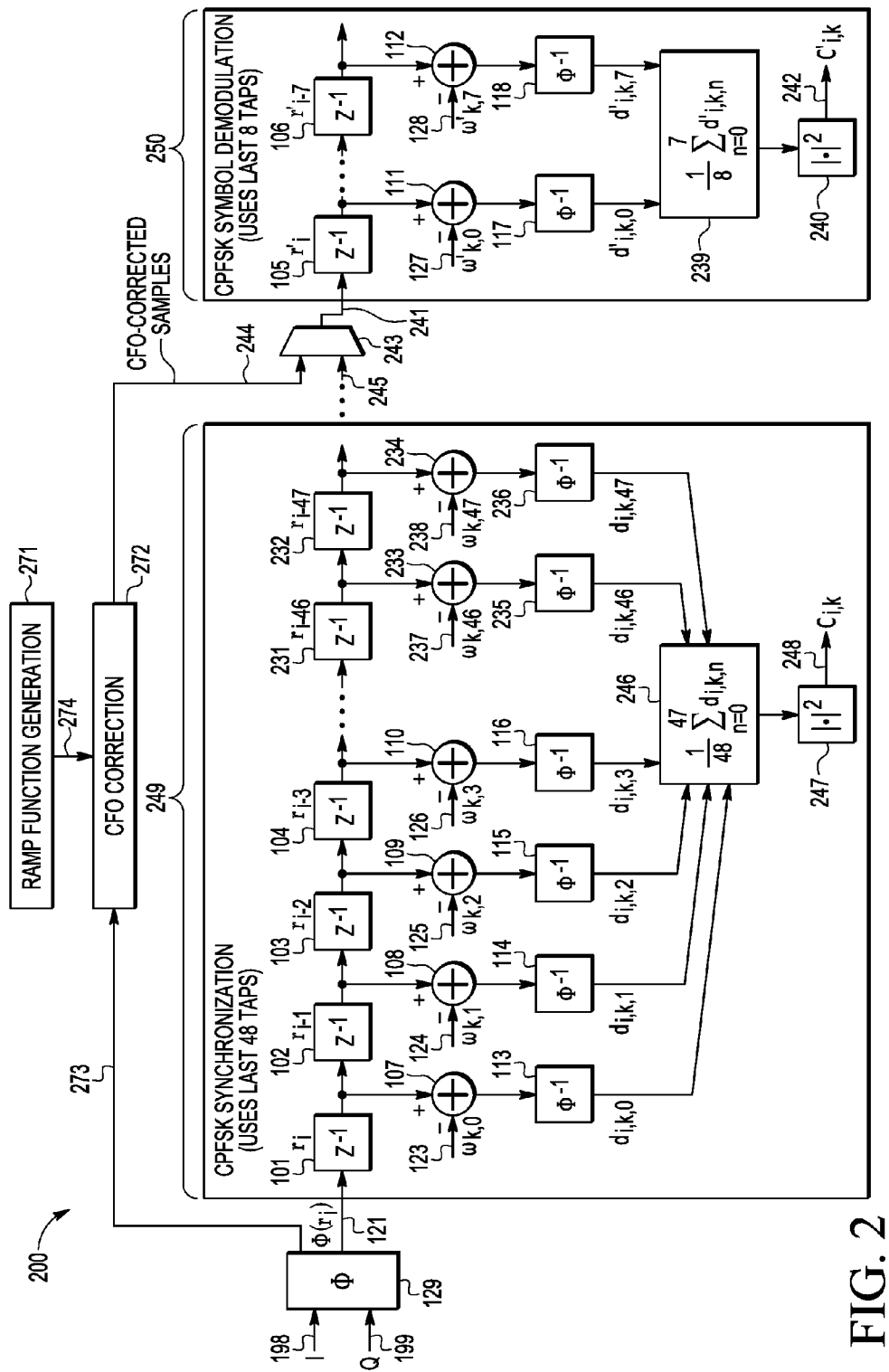
FIG. 2 is a block diagram illustrating a form of a configurable correlator configured for timing and frequency synchronization and demodulation of continuous phase frequency shift keying signals in accordance with at least one embodiment.

FIG. 2 is a block diagram illustrating a form of a configurable correlator configured for timing and frequency synchronization and demodulation of CPFSK signals in accordance with at least one embodiment. Configurable correlator 200 comprises a plurality of correlator taps. A first subset of the plurality of correlator taps is configured to provide a synchronization subsystem 249 that includes taps corresponding to unit delay modules that include modules 101-104, 231, and 232. A second subset of the plurality of correlator taps that correspond to unit delay modules 105-106 is configured to provide a demodulation subsystem 250. Thus, both synchronization and demodulation can be performed using interchangeably configurable correlator taps. For CPFSK signals, the portion of the interchangeably configurable correlator taps allocated for performing synchronization is distinct from the other portion of the interchangeably configurable correlator taps allocated for performing demodulation. The portion allocated for synchronization can perform synchronization independently of the portion allocated for demodulation. For example, the portion allocated for synchronization can perform the synchronization first, then, after proper synchronization has been determined, the portion allocated for demodulation can perform the demodulation.

Synchronization subsystem 249 comprises a plurality of unit delay blocks 101-104, 231, and 232, a plurality of adder blocks 107-110, 233, and 234, a plurality of phase domain to I, Q domain blocks 113-116, 235, and 236, a summer block 246, and a squaring block 247. Demodulation subsystem 250 comprises a plurality of unit delay blocks 105 and 106, a plurality of adder blocks 111 and 112, a plurality of phase domain to I, Q domain blocks 117 and 118, a summer block 239, and a squaring block 240. The unit delay blocks 101-106, 231, and 232, adder blocks 107-112, 233, and 234, and phase domain to I, Q domain blocks 113-118, 235, and 236 are among larger pluralities of such elements configured as successive correlator taps of configurable correlator 100. Each correlator tap comprises a respective unit delay block, adder block, and phase domain to I, Q domain block. For clarity, not all correlator taps are illustrated in FIG. 2. Input 121, which provides a phase domain representation of a complex baseband input signal, denoted as $\Phi(r_i)$, is coupled to an input of unit delay block 101. Unit delay blocks 101-104 of FIG. 1, along with unit delay blocks 231 and 232 not shown in FIG. 1, are configured and operate in accordance with the description of FIG. 1. Adder blocks 107-110 of FIG. 1, along with adder blocks 237 and 238 not shown in FIG. 1, are configured and operate in accordance with the description of FIG. 1. Phase domain to I, Q domain blocks 113-116 of FIG. 1, and phase domain to I, Q domain blocks 235 and 236 not shown in FIG. 1, are configured and operate in accordance with the description of FIG. 1. The correlator taps formed from such elements provide complex representations of the differences they determine to inputs of summer block 246.

Additional correlator taps can exist between unit delay block 104 and unit delay block 231, depending on the number of correlator taps to be provided in any particular implementation. The outputs of the additional correlator taps can be provided to summer block 246. In the example illustrated in FIG. 2, 48 correlator taps are provided for synchronization block 249.

Summer block 246 adds the complex representations of the differences of each correlator tap of synchronization block 249 and provides the sum to squaring block 247. Squaring block 247 squares the absolute value of the sum to provide a correlation value at output 248 to establish synchronization.

In demodulation block 250, unit delay blocks 105 and 106 of FIG. 1, adder blocks 111 and 112 of FIG. 1, and phase domain to I, Q domain blocks 117 and 118 of FIG. 1 are configured and operate in accordance with the description of FIG. 1. Additional correlator taps can exist between unit delay block 105 and unit delay block 106, depending on the number of correlator taps to be provided in any particular implementation. The outputs of the additional correlator taps can be provided to summer block 239. In the example illustrated in FIG. 2, eight correlator taps are provided for demodulation block 250.

Phase domain to I, Q domain blocks 117 and 118 provide complex representations of differences to inputs of summer block 239. Summer block 239 adds the complex representations of the differences of each correlator tap of demodulation block 250 and provides the sum to squaring block 240. Squaring block 240 squares the absolute value of the sum to provide a correlation value at output 242 to determine demodulation.

Figure 3:
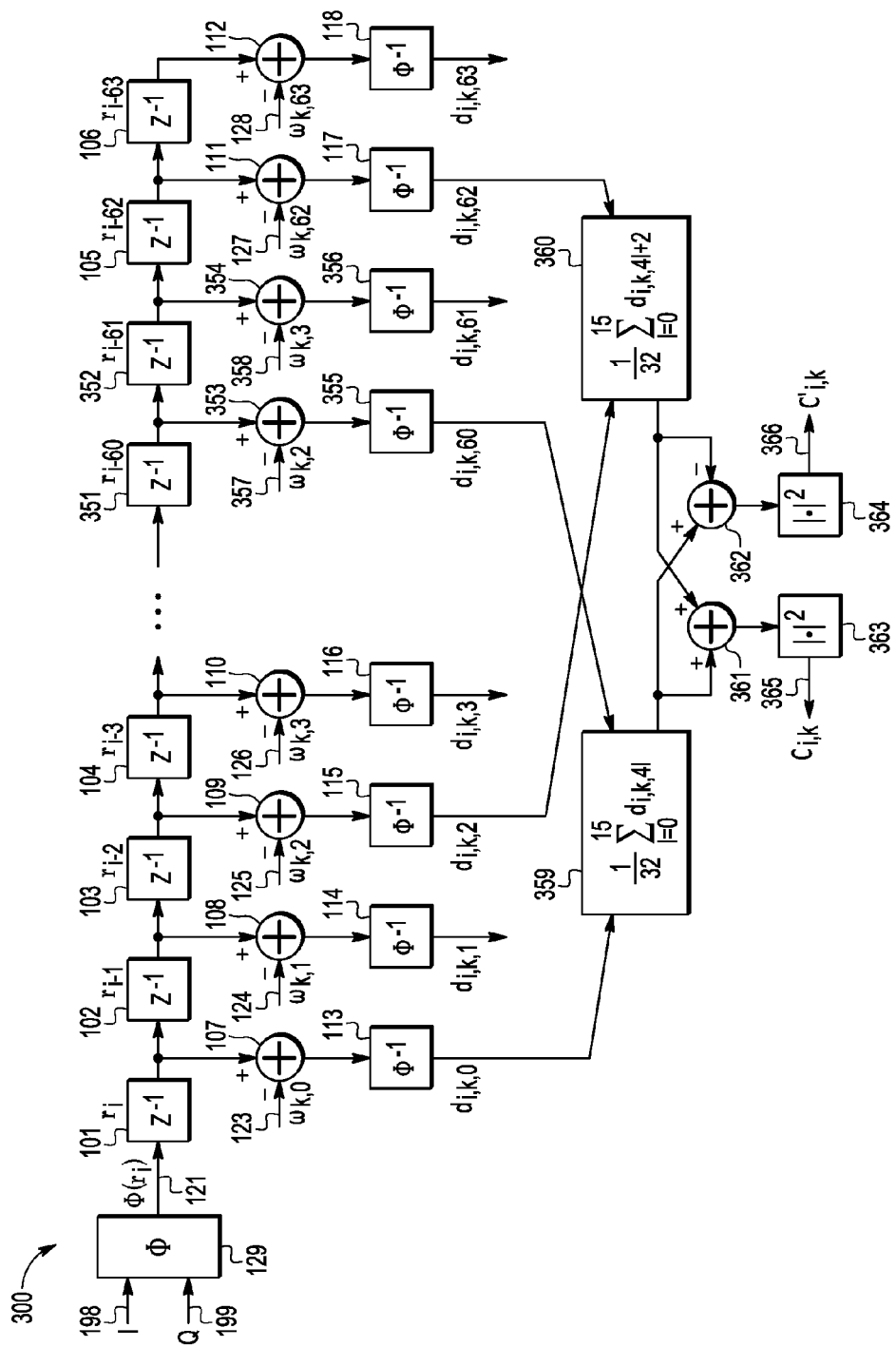
FIG. 3 is a block diagram illustrating a form of a configurable correlator configured for timing and frequency synchronization and demodulation of spread spectrum signals in accordance with at least one embodiment.

FIG. 3 is a block diagram illustrating a form of a configurable correlator configured for timing and frequency synchronization and demodulation of spread spectrum signals in accordance with at least one embodiment. Configurable correlator 300 comprises a plurality of unit delay blocks 101-104, 351, 352, 105, and 106, a plurality of adder blocks 107-110, 353, 354, 111, and 112, a plurality of phase domain to I, Q domain blocks 113-116, 355, 356, 117, and 118, summer blocks 359 and 360, adder blocks 361 and 362, and squaring blocks 363 and 364. The unit delay blocks 101-104, 351, 352, 105, and 106, adder blocks 107-110, 353, 354, 111, and 112, and phase domain to I, Q domain blocks 113-116, 355, 356, 117, and 118 are among larger pluralities of such elements configured as successive correlator taps of configurable correlator 300. Each correlator tap comprises a respective unit delay block, adder block, and phase domain to I, Q domain block. For clarity, not all correlator taps are illustrated in FIG. 3. Input 121, which provides a phase domain representation of a complex baseband input signal, denoted as $\Phi(r_i)$, is coupled to an input of unit delay block 101.

Unit delay blocks 101-104, 351, 352, 105, and 106 receives delayed phase domain representations of the complex baseband input signal and perform a unit delay to provide samples of the phase domain representation of the complex baseband input signal further delayed by an additional one sampling time for each stage. Unit delay blocks 101-104, 351, 352, 105, and 106, adder blocks 107-110, 353, 354, 111, and 112, and phase domain to I, Q domain blocks 113-116, 355, 356, 117, and 118 are configured and operate as described above with respect to FIG. 1. However, since only alternate (e.g., odd numbered) correlator tap outputs are used, the output of phase domain to I, Q domain block 116 is unused and may be left unconnected. The alternate correlator tap outputs the complex representations of the differences to one or the other of summer block 359 and summer block 360.

Additional correlator taps can exist between unit delay block 104 and unit delay block 351, depending on the number of correlator taps to be provided in any particular implementation. The outputs of the additional correlator taps can be provided to summer block 359 or 360 or left unconnected, following the pattern shown with respect to the first four correlator taps shown in FIG. 3. In the example illustrated in FIG. 3, 64 correlator taps are provided, not all of which need be used for any particular configuration of the configurable correlator.

Summer block 359 adds the complex representations of the differences of the first, fifth, ninth, $13^{th}$, $17^{th}$, $21^{st}$, $25^{th}$, $29^{th}$, $33^{rd}$, $37^{th}$, $41^{st}$, $45^{th}$, $49^{th}$, $53^{rd}$, $57^{th}$, and $61^{st}$ correlator taps and provides the sum to an additive input of adder 361 and to an additive input of adder 362. Summer block 360 adds the complex representations of the differences of the third, seventh, $11^{th}$, $15^{th}$, $19^{th}$, $23^{rd}$, $27^{th}$, $31^{st}$, $35^{th}$, $39^{th}$, $43^{rd}$, $47^{th}$, $51^{st}$, $55^{th}$, $59^{th}$, and $63^{rd}$ correlator taps and provides the sum to a second additive input of adder 361 and to a subtractive input of adder 362. As the 16 codes representing symbols according to IEEE 802.15.4 include eight which differ from the other eight by having every other bit inverted, adder 361, with two additive inputs, and adder 362, with one additive input and one subtractive input, can, given the selected correlator taps providing outputs to summer blocks 359 and 360, simultaneously search for and provide correlation with one code of one group of eight codes and one code of the other group of eight codes.

Adder 361 provides an output to squaring block 363. Adder 362 provides an output to squaring block 364. Squaring block 363 squares the absolute value of the sum obtained from adder 361 to provide a correlation value at output 365. Squaring block 364 squares the absolute value of the difference obtained from adder 362 to provide a correlation value at output 366. Because both output 365 and 366 can provide correlation values at the same time, all possible codes can be searched in half the time that would be required with a single summer block and a single squaring block.

Figure 4:
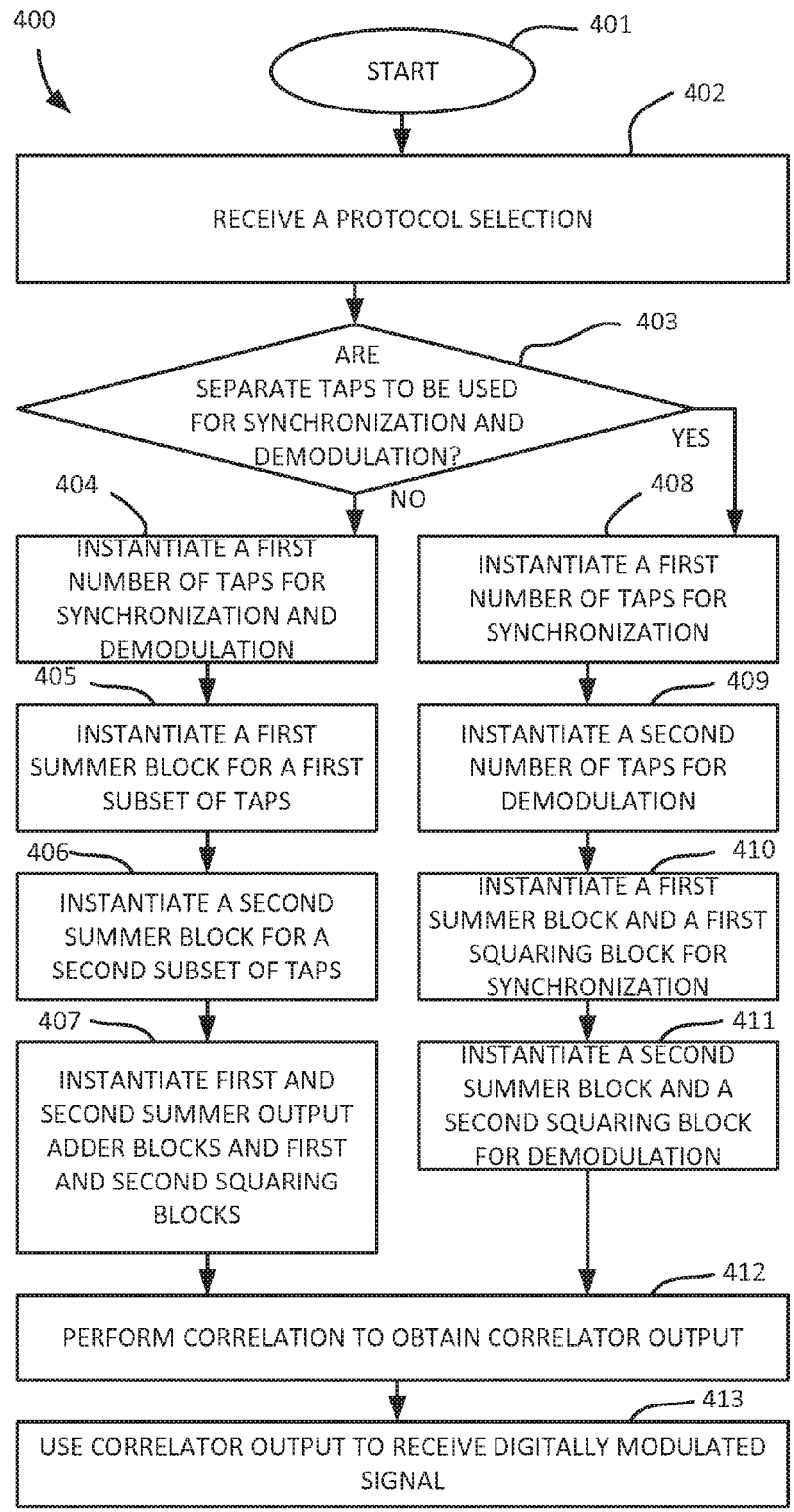
FIG. 4 is a flow diagram illustrating a method for configuring a configurable correlator in accordance with at least one embodiment.

FIG. 4 is a flow diagram illustrating a method for configuring a configurable correlator in accordance with at least one embodiment. Method 400 begins in block 401 and continues to block 402. At block 402, a protocol selection is received. As an example, a DSSS protocol, such as an IEEE 802.15.4 protocol, can be the selected protocol. As another example, a CPFSK protocol, such as a Bluetooth Low Energy (BLE) or ANT protocol can be the selected protocol. In accordance with at least one embodiment, protocol selection can be performed iteratively among multiple protocols to identify any protocols that may be in use at a particular time. From block 402, method 400 continues to decision block 403.

At decision block 403, a decision is made as to whether or not separate correlator taps are to be used for synchronization and demodulation. The decision may be made, for example, based on the protocol selection of block 402. As an example, for a DSSS protocol, a common set of correlator taps may be used for synchronization and demodulation. As another example, for a CPFSK protocol, separate sets of correlator taps may be used for synchronization and demodulation. As an example, the set of correlator taps used for synchronization and the set of correlator taps used for demodulation may be implemented as distinct sets of correlator taps from among a total number of correlator taps. The set of correlator taps used for synchronization may be used to obtain timing and frequency parameters to be used by the set of correlator taps used for demodulation. If separate sets of correlator taps are not to be used for synchronization and demodulation (e.g., if a common set of correlator taps are to be used for both synchronization and demodulation), method 400 continues to block 404.

At block 404, a first number of correlator taps are instantiated for synchronization and demodulation. From block 404, method 400 continues to block 405. At block 405, a first summer block is instantiated for a first subset of the first number of correlator taps. From block 405, method 400 continues to block 406. At block 406, a second summer block is instantiated for a second subset of the first number of correlator taps. From block 406, method 400 continues to block 407. At block 407, first and second summer output adder blocks and first and second squaring blocks are instantiated. From block 407, method 400 continues to block 412.

If, at decision block 403, separate correlator taps are to be used for synchronization and demodulation, method 400 continues to block 408. At block 408, a first number of taps is instantiated to perform synchronization. From block 408, method 400 continues to block 409. At block 409, a second number of taps is instantiated to perform demodulation. From block 409, method 400 continues to block 410. At block 410, a first summer block and a first squaring block are instantiated to perform synchronization. From block 410, method 400 continues to block 411. At block 411, a second summer block and a second squaring block are instantiated to perform demodulation. From block 411, method 400 continues to block 412. At block 412, correlation is performed to obtain a correlator output. From block 412, method 400 continues to block 413. At block 413, the correlator output is used to receive a digitally modulated signal.

While FIG. 4 shows instantiation of particular numbers of summer blocks, summer output adder blocks, and squaring blocks, it should be appreciated that other embodiments may be practiced with different number of such elements. For example, at least one embodiment may be practiced with more than two instances of at least one of the summer blocks, the summer output adder blocks, and the squaring blocks.

Figure 5:
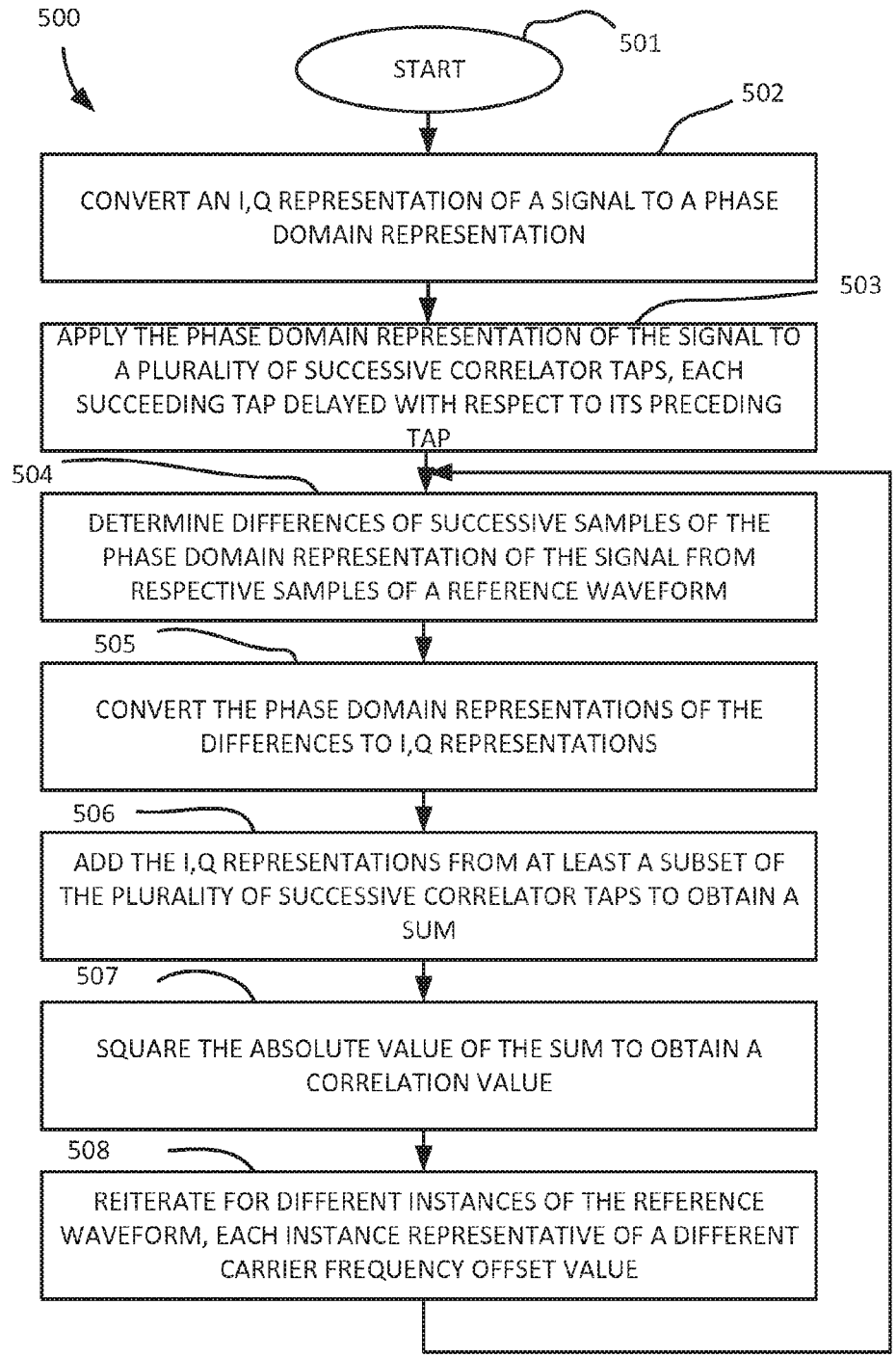
FIG. 5 is a flow diagram illustrating a method of operation of a configurable correlator in accordance with at least one embodiment.

FIG. 5 is a flow diagram illustrating a method of operation of a configurable correlator in accordance with at least one embodiment. Method 500 begins at block 501 and continues to block 502. At block 502, a complex (e.g., I, Q) representation of a signal is converted to a phase domain representation. For example, a signal can be represented by a real signal, referred to as an in-phase (I) component, and an imaginary signal, referred to as a quadrature component. The real signal and the imaginary signal together provide a complex representation of the signal, specifically an I, Q representation of the signal. As another example, a signal can be represented in terms of its phase relationships, such as the variation of a reference point (for example, a zero crossing point) of a waveform from a corresponding reference point of an ideal periodic waveform. A representation of a signal according to its phase relationships is a phase domain representation of the signal. From block 502, method 500 continues to block 503. At block 503, the phase domain representation of the signal is applied to a plurality of successive correlator taps. Each succeeding correlator tap is delayed with respect to its preceding tap. From block 503, method 500 continues to block 504. At block 504, differences between successive samples of the phase representation of the signal and the respective samples of a reference waveform are determined. From block 504, method 500 continues to block 505. At block 505, the phase domain representations of the differences are converted to complex (e.g., I, Q) representations. From block 505, method 500 continues to block 506. At block 506, the complex representations from at least a subset of the plurality of successive correlator taps are added together to obtain a sum. From block 506, method 500 continues to block 507. At block 507, the absolute value of the sum is squared to obtain a correlation value. From block 507, method 500 continues to block 508. At block 508, blocks 504, 505, 506, and 507 are reiterated for different instances of the reference waveform. Each instance of the reference waveform is representative of a different carrier frequency offset (CFO) value.

While FIG. 5 describes conversion of a signal to a phase domain representation, at least one other embodiment may be practiced using a signal in the I, Q domain without conversion to the phase domain. As an example, the correlator taps may perform multiplication of the delayed signal samples with delayed versions of a reference waveform instead of addition or subtraction, as may be performed for phase domain representations. Correlation in the I, Q domain can be used for reception of a wide range of signals, including signals having other than constant envelope modulations. As an example, correlation in the I, Q domain can be used for reception of signals in which modulation of the amplitude of the signal is at least part of the modulation scheme used to convey information in the signal. As an example, blocks 502 and 505 could be omitted from the method of FIG. 5, and blocks 503 and 504 could be modified to operate on an I, Q representation of the signal rather than a phase domain representation of the signal. As an example, instead of determining differences in block 504, products can be determined by multiplying successive samples of the complex domain representation of the signal by respective samples of the reference waveform.

A configurable correlator architecture supports joint timing and frequency synchronization and demodulation of signals according to multiple communication protocols. As examples, the configurable correlator can be used in Institute of Electrical and Electronics Engineers (IEEE) 802.15.4, Dynastream Innovations, Inc./ANT Wireless ANT, Bluetooth Low Energy (BLE) and similar CPFSK modems. As wireless networking continues to increase, even between devices which traditionally have not been wirelessly networked, not all devices utilize the same wireless networking protocols. Some wireless networking protocols are designed for lower data rates, some for higher data rates; some are designed for shorter ranges, some for longer ranges; some are designed for sparser networks, some for denser networks; some are older technologies, some are newer; some are designed for more cost sensitive applications, some for less cost sensitive applications; and some are designed for a narrower scope, such as a personal area network (PAN) per se, some are designed for a broader scope, such as to include the devices within a larger network, such as the internet, as may be referred to as an Internet of Things (IoT). Given the growth of wireless networking in its various forms, it can be useful to provide common support for multiple wireless networking technologies. As examples, devices using BLE, ANT, IEEE 802.15.4 etc. coexist in many environments in which interoperable support for multiple protocols could be advantageous. However, there are significant differences in the physical (PHY) receiver processing chains for different protocols, such as BLE and IEEE 802.15.4. So an efficient joint receiver solution that produces optimal performance, while keeping the costs and complexity low, while potentially advantageous, has heretofore faced obstacles to realization.

By providing a new and efficient signal processing architecture for joint timing and frequency synchronization for BLE, ANT and similar CPFSK modulation schemes, and IEEE 802.15.4, the configurable correlator architecture presented herein enables efficient implementation of the joint receiver. Besides timing and frequency synchronization, it can also be used for symbol demodulation. In accordance with at least one embodiment, a configurable correlator architecture supports joint timing and frequency synchronization and symbol demodulation in spread spectrum modems, such as IEEE 802.15.4 modems, which utilize DSSS modulation, and CPFSK modems, such as BLE and ANT modems, which utilize Gaussian frequency shift keying (GFSK). In the accompanying drawings and description, $\Phi(c)$ denotes the phase of the complex number c and $\Phi^{\wedge}(-1)(\theta)$ denotes the complex number of unit magnitude with phase $\theta$.

It will be appreciated that many variations or additional features can be implemented. For example, in accordance with at least one embodiment, a correlation operation is performed in the phase domain. Performing the correlation operation in the phase domain can avoid complex multiplications, simplifying implementation and reducing cost and complexity. What might otherwise involve complicated calculations can be simplified using representations whose resolutions are limited to approximations sufficient for proper operation. In accordance with at least one embodiment, reduced bit-width input samples can be utilized efficiently. As an example, five-bit input phase values can be used. A lookup table (LUT) may be used to store entries. For example, $\Phi^{\wedge}(-1)(\theta)$ can be determined using LUT of only 8 entries corresponding to 1st quadrant phase values. By appropriately choosing the inputs to the mean-calculators, different configurations can be achieved. Final squared magnitudes can be obtained using a 64-entry LUT. Other approximations may also be used.

A configurable correlator comprises a plurality of correlator taps that can be selected and combined in several ways to provide compatibility with several modulation techniques. An exemplary correlator configuration for CPFSK schemes (e.g., BLE, ANT, etc.) can be configured by instantiating a first subset of correlator taps to perform synchronization and by instantiating a second subset of the correlator taps to perform demodulation. An exemplary correlator configuration for DSSS (e.g., IEEE 802.15.4) can utilize a common set of correlator taps for both synchronization and demodulation. Alternate $d_{i,k,t}$'s left unconnected to use only alternate input samples in correlation. By combining the partial sums in two different manners, correlation values for two different PN sequences can be simultaneously calculated.

Substantial reduction in hardware implementation size can be realized. Whereas separate hardware would have heretofore been required for implementing support for both BLE and IEEE 802.15.4, and a phase discriminator based receiver for BLE would not have been adaptable to support ANT or other CPFSK schemes, at least one embodiment uses a configurable correlator to provide common support BLE, ANT and similar CPFSK schemes as well as IEEE 802.15.4. By providing such common support in the same configurable correlator, a smaller hardware implementation size can be achieved. As an example, an implementation can be 25% smaller in size compared to a legacy implementation using older technology. In accordance with at least one embodiment, significant performance improvements can be achieved due to better resilience to carrier offsets. The better resilience to carrier offsets can be achieved not only because of the ability of the configurable correlator to search for correlation over a wide range of CFOs, but also because the configurable correlator can provide better performance for potential CFOs farther from a nominal carrier frequency than other receiver technologies.

Due to complexity and cost problems, maximum likelihood (ML) receivers are typically avoided in IoT and connectivity applications. By providing an efficient integrated correlator for supporting ML-type receiver implementations for a wide range of applications including BLE, ANT, IEEE 802.15.4 and many other CPFSK modulation schemes, a high level of performance can be provided in a simple and inexpensive manner according to at least one embodiment. Thus, an efficient receiver useful for many IoT standards can be realized, leading to significant hardware cost savings. Examples of such a receiver can be applied to products such as IoT and other connectivity products in the 2.4 GHz, sub-GHz bands (e.g., 315 MHz, 433 MHz, and 902 MHz), as well as other bands.

While the configurable correlator architecture described above can provide compatibility with several modulation techniques, another aspect of a receiver that can be important is an ability to accurately receive an incoming signal even when the characteristics of the incoming signal may be far from ideal. As low cost is an important consideration for devices in competitive markets, for example, in IoT and connectivity applications utilizing BLE, ANT and similar CPFSK modulation schemes, the local oscillator (LO) accuracy requirements can be rather loose. Accordingly, receivers need to withstand large total carrier frequency offsets (CFOs), for example, CFOs as large as 125 ppm (e.g., ±300 kHz in 2.4 GHz band). In general, the available low-complexity receivers are not capable of handling such large offsets, which typically results in reduced throughput due to poor timing and frequency synchronization. For example, receiver solutions based on phase-discriminator techniques are highly sensitive to CFOs. Maximum-likelihood (ML) solutions are not typically pursued due to cost constraints.

In accordance with at least one embodiment, a low-complexity ML receiver provides improved immunity to CFOs and an improved range of CFOs over which such improved immunity is provided. As an example, the ML receiver may be implemented as a more focused ML receiver that evaluates a reduced set of CFO candidate values instead of a full ML receiver that evaluates all possible CFO values. One embodiment of the ML receiver uses a bank of correlators combined with multiple peak selection and interpolation methods for joint timing and frequency synchronization. Such a ML receiver is suitable for efficient hardware implementation using the configurable correlator architecture described herein. Hardware components such as the correlator and CFO correction module can be shared with another type of receiver, such as a DSSS receiver, for example, an IEEE 802.15.4 receiver, providing a very efficient solution for a joint receiver capable of receiving signals according to different modulation techniques and communications protocols.

In accordance with at least one embodiment, coarse symbol timing detection and CFO estimation and correction are provided. The coarse symbol timing detection provides temporal alignment with transmitted symbols, and the CFO estimation and correction allows frequency variations between the frequency references of a transmitter and a receiver to be accommodated.

The coarse symbol timing detection and CFO estimation and correction technique can be applied to a CPFSK modulation scheme such as BLE or ANT. A BLE or ANT packet structure includes a preamble, an access address, a packet data unit (PDU), and a check value, such as a cyclic redundancy check (CRC) value, transmitted sequentially in a temporally contiguous manner. As examples, the preamble may be one octet long, the access address may be two to four octets long, the PDU may be of a variable length, and the CRC value may be two to three octets long. The preamble includes a repeating pattern. A segment of the preamble (typically spanning 1 or more repetitions of the pattern) is used as a signature waveform. Multiple correlation waveforms are generated from the signature by applying different CFOs. Coarse symbol timing and estimated CFO are later used to search for the access address and obtain packet synchronization.

In accordance with at least one embodiment, coarse symbol timing detection uses a bank of correlators with each correlator matched to one of a set of equally spaced CFOs. Correlation calculations can be performed efficiently in the phase domain. Performing correlation calculations in the phase domain can provide better performance with smaller bit-widths compared to performing correlation calculations in the I/Q domain, although at least one other embodiment may perform correlation calculations in the I/Q domain. By performing correlation calculations in the phase domain, more complicated calculations, such as multiplications, can be avoided, for example, with difference calculations used instead, leading to a more efficient implementation.

While a parameters value may be selected based on a single candidate value that provides the highest correlation value, in accordance with at least one embodiment, multiple peak selection may be performed. To accomplish multiple peak selection, for each received sample, in addition to the largest correlation, the next largest correlation value is also used to calculate a temporary adjusted peak value, provided the next largest correlation value exceeds a threshold value. If the next largest correlation value does not exceed the threshold value, the largest (e.g., peak) correlation value can be used by itself without the next largest correlation value. Improved timing detection performance can be provided by emphasizing sample points with multiple large correlations over those with only a lonesome largest correlation. Multiple peak selection can also improve CFO estimation performance.

Figure 6:
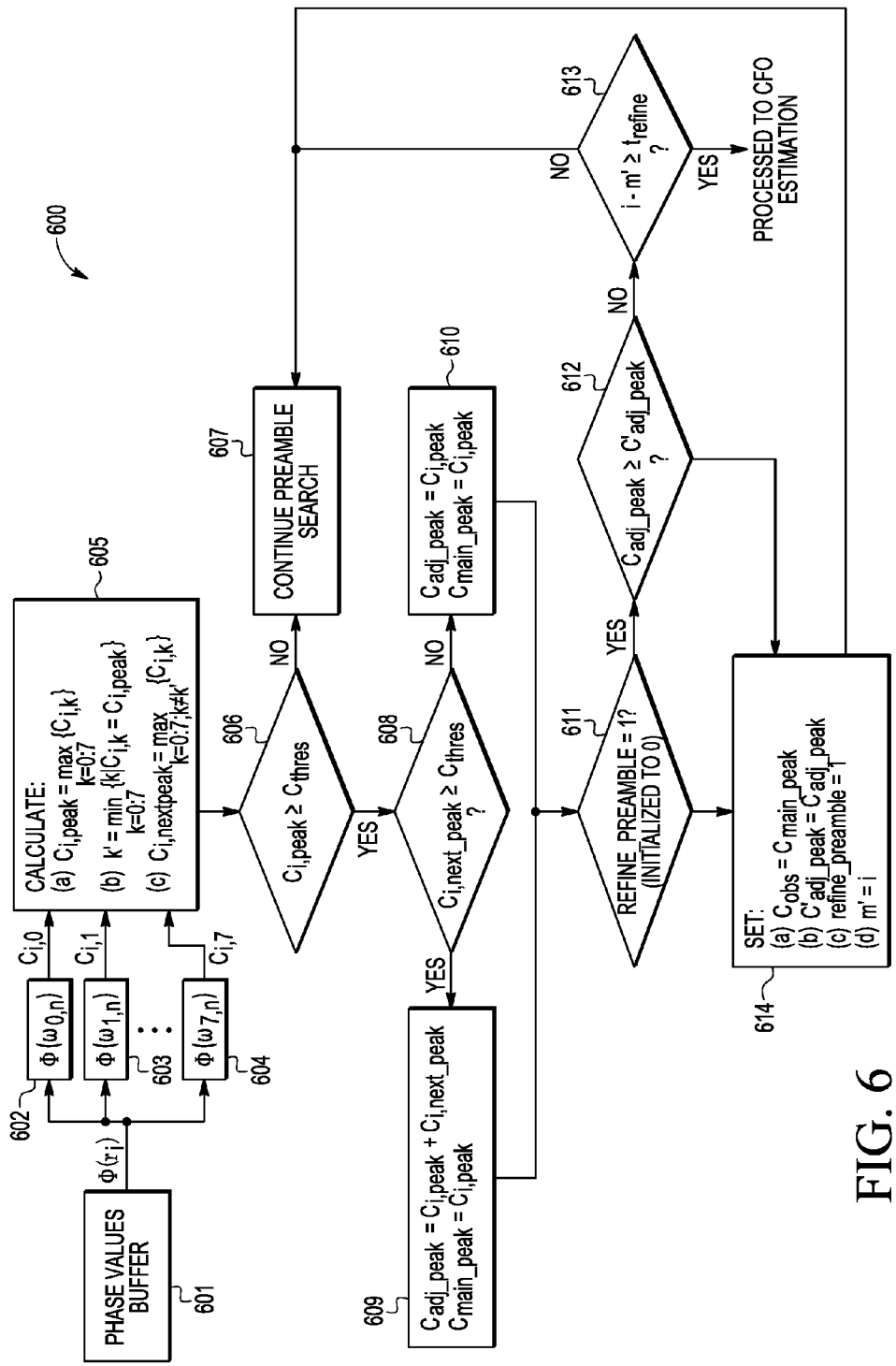
FIG. 6 is a flow diagram illustrating a method for coarse symbol timing detection for a configurable correlator in accordance with at least one embodiment.

FIG. 6 is a flow diagram illustrating a method for coarse symbol timing detection for a configurable correlator in accordance with at least one embodiment. Method 600 begins by providing samples of a phase domain representation of a complex baseband input signal from a phase values buffer in block 601. The samples of the phase domain representation of the complex baseband input signal are provided to correlator taps to perform correlations at blocks 602, 603, and 604. The ellipsis denotes that the number of correlators corresponding to different CFO candidate values may be configured according to the desired application, for example, eight in the illustrated example, only three of which are shown explicitly. Correlation values from the correlations are provided to calculation block 605, where multiple peak selection is performed by identifying a peak correlation value and a next largest correlation value. The next largest correlation value is the correlation value that would be the largest correlation value but for the peak correlation value. From block 605, method 600 continues to decision block 606. In decision block 606, the peak correlation value is compared to a threshold correlation value. When the peak correlation value is less than the threshold correlation value, method 600 continues to block 607. In block 607, the preamble search continues.

When the peak correlation value is greater than or equal to the threshold correlation value, method 600 continues from decision block 606 to decision block 608. In decision block 608, the next highest correlation value is compared to the threshold correlation value. When the next highest correlation value is less than the threshold correlation value, method 600 continues to block 610. In block 610, an adjusted peak correlation value is set to be equal to the peak correlation value, and a main peak correlation value is set to be equal to the peak correlation value. When the next largest correlation value is greater than or equal to the threshold correlation value, method 600 continues to block 609. In block 609, the adjusted peak correlation value is set to be equal to the sum of the peak correlation value and the next highest correlation value, and the main peak correlation value is set to be equal to the peak correlation value.

From either of blocks 609 and 610, method 600 continues to decision block 611. In decision block 611, a decision is made as to whether or not a refine_preamble value, which is initialized to zero, is equal to one. If the refine_preamble value is equal to one, method 600 continues to decision block 612. In decision block 612, the adjusted peak correlation value is compared to a previous adjusted peak correlation value. If the adjusted peak correlation value is greater than or equal to the previous adjusted peak correlation value or, if at decision block 611 the refine_preamble value is not equal to one, method 600 continues to block 614. In block 614, an observed correlation value is set to be equal to the main peak correlation value, an updated adjusted peak correlation value is set to be equal to the adjusted peak correlation value, the refine_preamble value is set to be equal to one, and a coarse timing index is set to value corresponding to the temporal position of the current sample of the phase domain representation of the complex baseband input signal. The observed correlation value is the highest correlation value seen until the current time during a current instance of preamble detection. The updated adjusted peak correlation value is the highest adjusted peak correlation value seen until the current time during the current instance of preamble detection. From block 614, method 600 continues to block 607. In block 607, the preamble search continues.

If, in decision block 612, the adjusted peak correlation value is less than the previous adjusted peak correlation value, method 600 continues to decision block 613. In decision block 613, the coarse timing index is subtracted from the value corresponding to the temporal position of the current sample of the phase domain representation of the complex baseband input signal and compared a value $t_{refine}$. If the difference resulting from such subtraction is less than the value $t_{refine}$, method 600 continues to block 607. In block 607, the preamble search continues. If the difference resulting from such subtraction is greater than or equal to the value $t_{refine}$, method 600 continues by proceeding to CFO estimation.

CFO estimation can be performed by obtaining a coarse timing index —m', a set of correlation values $\Theta_k = \{C_{m'-l,k}, C_{m',k}, C_{m'+l,k}\}$; $l=1, 2, \ldots$ for each CFO candidate $f_k$, and a final adjusted-peak-correlation $C_{obs}$. For each set $\Theta_k$, calculate $h_k$ as the number of its elements exceeding the following equation for C':

$$C' = 0.9219 \cdot C_{obs} = \left(1 - \frac{1}{16} - \frac{1}{64}\right) \cdot C_{obs}$$

A CFO estimate can be obtained using the following equation for $f_{offset}$:

$$f_{offset} = \frac{\sum_{k=0}^{7} h_k f_k}{\sum_{k=0}^{7} h_k}$$

Figure 7:
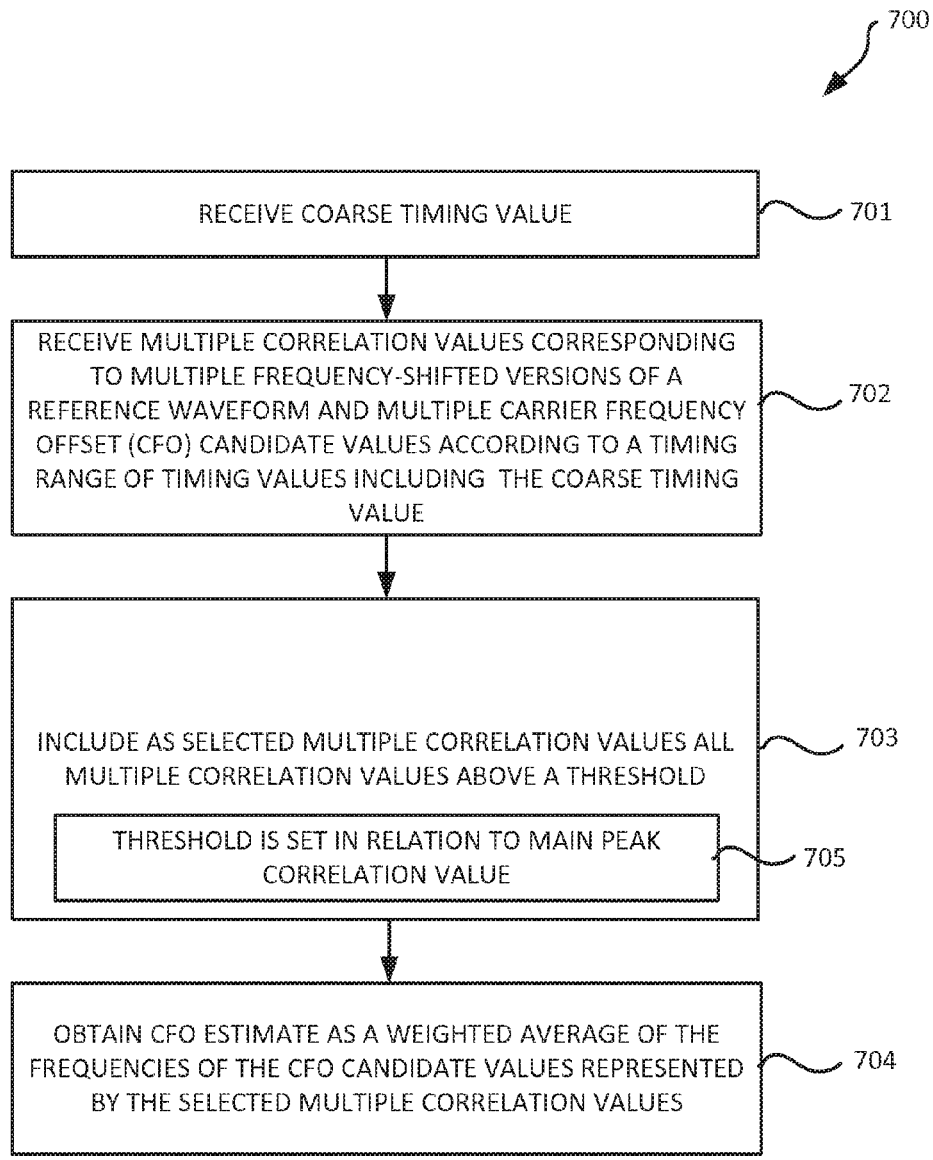
FIG. 7 is a flow diagram illustrating a method for CFO estimation for a receiver using a correlator in accordance with at least one embodiment.

FIG. 7 is a flow diagram illustrating a method for CFO estimation for a receiver using a correlator in accordance with at least one embodiment. Method 700 begins in block 701, where a coarse timing value is received. As an example, the coarse timing value can be received from a method such as the method illustrated in FIG. 6. From block 701, method 700 continues to block 702. In block 702, multiple correlation values corresponding to multiple frequency-shifted versions of a reference waveform and multiple carrier frequency offset (CFO) candidate values according to a timing range of timing values including the coarse timing values are received, for example, from a method such as the method illustrated in FIG. 6. From block 702, method 700 continues to block 703. In block 703, the multiple correlation values are compared to a threshold, and all multiple correlation values above the threshold are included in a group of selected multiple correlation values. As an example, as shown by sub-block 705, the threshold may be set in relation to a main peak correlation value, such as the main peak correlation value determined according to the method illustrated in FIG. 6, for example, the observed correlation value discussed above with respect to block 614 of FIG. 6. As examples, the threshold may be set to between 0.90 and 0.95 of the main peak correlation value, to between 0.91 and 0.93 of the main peak correlation value, to between 0.920 and 0.925 of the main peak correlation value, or to between 0.921 and 0.923 of the main peak correlation value. Alternatively, the threshold can be set to a different value, either in relation to or not in relation to the main peak correlation value. From block 703, method 700 continues to block 704. In block 704, a CFO estimate is obtained as a weighted average of the frequencies of the CFO candidate values represented by the selected multiple correlation values. As an example, the weighted average can be calculated by multiplying the number of selected multiple correlation values corresponding to respective CFO candidate values by the respective frequencies of the CFO candidate values represented by the selected multiple correlation values, summing those products to produce a sum, and dividing that sum by a sum of the selected correlation values.

As correlation is performed with respect to samples of a reference waveform, the reference waveform should be one whose properties can be recognized and one which corresponds to portion of the received signal occurring early enough that the results of the correlation can be fruitfully applied to the reception of at least a portion of the incoming signal conveying a data payload. As some signals comprise a modulated preamble signal that meets those criteria, at least one embodiment uses correlation reference waveforms derived directly from the modulated preamble signal and hence applicable to CPFSK systems as well as other systems, such as DSSS systems. Because of the relatively early presence of the preamble in the received signal, joint timing and frequency synchronization can be performed before symbol demodulation is performed.

At least one embodiment is based on a bank of correlators, wherein each correlator searches for the preamble affected by a different CFO. By obtaining correlations with multiple frequency-shifted versions of the preamble, the CFO of the received signal can be accurately estimated. At least one embodiment uses a common bank of correlators for joint timing recovery and CFO estimation. Such correlators can, for example, provide an efficient and integrated solution to support a very wide range of applications including BLE, ANT, IEEE 802.15.4 (including Gaussian frequency shift keying (GFSK) and multi-rate and multi-regional frequency shift keying (MR-FSK) implementations) and many other CPFSK modulation schemes.

In accordance with at least one embodiment, improved receiver performance can be provided without adverse impact on implementation costs especially in joint receiver solutions for IoT and connectivity. In accordance with at least one embodiment, other benefits can include wider network coverage and lower power consumption.

In accordance with at least one embodiment, a correlator is implemented in an electronic circuit and comprises a plurality of correlator taps configurable to provide synchronization and symbol modulation for a plurality of modulation systems. The correlator also comprises a first correlation calculator. For a first modulation system of the plurality of modulation systems, the first correlation calculator is configurable to combine a first group of individual correlator tap values from each of a first group of the plurality of correlator taps to produce a first output value. A first correlation value is based on the first output value. The first correlation value is pertinent to synchronization. For a second modulation system of the plurality of modulation systems, the first correlation calculator is configurable to combine a third group of individual correlator tap values from each of a third group of the plurality of correlator taps to produce a third output value. A third correlation value is based upon the third output value. The third correlation value is pertinent, at a first time, to synchronization and, at a second time, to demodulation. The correlator also comprises a second correlation calculator. For the first modulation system, the second correlation calculator is configurable to combine a second group of individual correlator tap values from each of a second group of the plurality of correlator taps to produce a second output value. A second correlation value is based upon the second output value. The second correlation value is pertinent to demodulation.

In accordance with at least one embodiment, the first modulation system is a continuous phase frequency shift keying (CPFSK) modulation system and the second modulation system is a direct sequence spread spectrum (DSSS) modulation system. In accordance with at least one embodiment, the DSSS modulation system comprises a modulation system compliant with a protocol of Institute of Electrical and Electronics Engineers (IEEE) 802.15.4, and the CPFSK modulation system is selected from a group consisting of a Bluetooth Low Energy (BLE) modulation system and a Dynastream Innovations, Inc./ANT Wireless ANT modulation system. In accordance with at least one embodiment, the plurality of correlator taps configurable provide both time synchronization and frequency synchronization. In accordance with at least one embodiment, the plurality of correlator taps comprise adders, the adders configured to determine differences between phase domain representations of time delayed samples of a received signal and differences between phase domain representations of time indexed samples of a reference waveform.

In accordance with at least one embodiment, the correlator further comprises a complex representation to phase domain representation conversion block configured to provide phase domain representations of samples of a received signal to the plurality of correlator taps. Each of the plurality of correlator taps comprises a phase domain representation to complex representation conversion block configured to provide complex representations of the individual difference values. In accordance with at least one embodiment, each of the correlator taps is configured to provide differences over a plurality of carrier frequency offset (CFO) values based on reference waveform samples corresponding to the plurality of CFO values. In accordance with at least one embodiment, the plurality of correlator taps comprise multipliers. The multipliers configured to determine products of complex representations of time delayed samples of a received signal multiplied by complex domain representations of time indexed samples of a reference waveform.

In accordance with at least one embodiment, a method comprises receiving a protocol selection at a receiver. The method also comprises determining whether a same group of correlator taps is to be used for both synchronization and demodulation or a first group of correlator taps is to be used for synchronization and a second group of correlator taps is to be used for demodulation, the second group being mutually exclusive of the first group. The method also comprises, in response to determining that the first group of correlator taps is to be used for synchronization and the second group of correlator taps is to be used for demodulation, instantiating a first number of correlator taps of an electronic circuit for synchronization, instantiating a second number of the correlator taps of the electronic circuit for demodulation, instantiating a first correlation calculator of the electronic circuit for synchronization, and instantiating a second correlation calculator of the electronic circuit for demodulation. The method also comprises, in response to determining that the same group of correlator taps are to be used for both synchronization and demodulation, instantiating a third number of correlator taps of the electronic circuit for synchronization and demodulation, instantiating the first correlation calculator of the electronic circuit for a first subset of the third number of correlator taps, instantiating the second correlation calculator of the electronic circuit for a second subset of the third number of correlator taps, instantiating a first correlation calculator output adder, and a second correlation calculator output adder, wherein the first correlation calculator, the second correlation calculator, the first correlation calculator output adder, and the second correlation calculator output adder are pertinent, at a first time, for synchronization and, at a second time, for demodulation. The method also comprises performing correlation to obtain a correlation value for receiving a digitally modulated signal.

In accordance with at least one embodiment, the determining whether a same group of correlator taps is to be used for both synchronization and demodulation or a first group of correlator taps is to be used for synchronization and a second group of correlator taps is to be used for demodulation comprises determining that the same group of correlator taps is to be used for both synchronization and demodulation when the protocol selection selects a direct sequence spread spectrum (DSSS) protocol and determining that the first group of correlator taps is to be used for synchronization and the second group of correlator taps is to be used for demodulation when the protocol selection selects a continuous phase frequency shift keying (CPFSK) protocol. In accordance with at least one embodiment, the DSSS protocol comprises an Institute of Electrical and Electronics Engineers (IEEE) 802.15.4 protocol and the CPFSK protocol is selected from a group consisting of a Bluetooth Low Energy (BLE) protocol and a Dynastream Innovations, Inc./ANT Wireless ANT protocol. In accordance with at least one embodiment, the synchronization comprises both time synchronization and frequency synchronization. In accordance with at least one embodiment, the performing the correlation to obtain the correlation value for receiving the digitally modulated signal comprises determining differences between phase domain representations of time delayed samples of a received signal and phase domain representations of time indexed samples of a reference waveform. In accordance with at least one embodiment, the method further comprises converting complex representations to phase domain representations of samples of a received signal, providing the phase domain representations to the correlator taps, and converting phase domain representations of individual difference values determined by the correlator taps to complex representations of the individual difference values. In accordance with at least one embodiment, the performing the correlation to obtain the correlation value for receiving the digitally modulated signal comprises providing differences, from the correlator taps instantiated at least for synchronization, over a plurality of carrier frequency offset (CFO) values based on reference waveform samples corresponding to the plurality of CFO values. In accordance with at least one embodiment, the performing the correlation to obtain the correlation value for receiving the digitally modulated signal comprises multiplying complex domain representations of time delayed samples of a received signal and complex domain representations of time indexed samples of a reference waveform, wherein either the complex domain representations of the time delayed samples of the received signal or the complex domain representations of the time indexed samples of the reference waveform are conjugated.

In accordance with at least one embodiment, a method, in a receiver, comprises applying representations of samples of a signal to a plurality of successive correlator taps, each of the successive correlator taps delayed with respect to its corresponding preceding correlator tap. The method also comprises performing, at the successive correlator taps, operations on the representations of the samples of the signal and time indexed samples of a reference waveform to provide correlative representations. The method also comprises, for a first modulation system, combining a first group of the correlative representations to provide a first output value and providing a first correlation value for synchronization of the signal based on the correlative representations. The method also comprises, for the first modulation system, combining a second group of the correlative representations to provide a second output value and providing a second correlation value for demodulation of the signal. The method also comprises, for a second modulation system, combining a third group of the correlative representations to provide a third output value and providing a third correlation value for synchronization and demodulation of the signal.

In accordance with at least one embodiment, the first modulation system is a continuous phase frequency shift keying (CPFSK) modulation system and the second modulation system is a direct sequence spread spectrum (DSSS) modulation system. In accordance with at least one embodiment, for the second modulation system, the combining the third group of the correlative representations of the differences to provide the third output value and providing the third correlation value for synchronization and demodulation of the signal further comprises, at an earlier time, performing the summing for synchronization, and, at a later time, performing the summing for demodulation. In accordance with at least one embodiment, the method further comprises, for the first modulation system, applying a carrier frequency offset (CFO) correction to the representations of the samples provided to a subset of the successive correlator taps from which the second group of correlative representations are obtained.

In accordance with at least one embodiment, a method, in a receiver, comprises obtaining a coarse timing value according to a peak correlation value and a next largest correlation value. The method also comprises receiving a plurality of correlation values corresponding to a plurality of frequency-shifted versions of a reference waveform and a plurality of carrier frequency offset (CFO) candidate values according to a timing range of timing values including the coarse timing value. The method also comprises including as selected correlation values the correlation values above a threshold. The method also comprises obtaining a CFO estimate as a weighted average of frequencies of the CFO candidate values represented by the correlation values. The method also comprises receiving payload data of the signal according to the CFO estimate.

In accordance with at least one embodiment, the including as the selected correlation values the correlation values above the threshold comprises setting the threshold in relation to the peak correlation value. In accordance with at least one embodiment, time indexed samples of a reference waveform comprise representations of a plurality of frequency-shifted versions. Each of the frequency-shifted versions is shifted according to a corresponding one of the plurality of CFO candidate values.

In accordance with at least one embodiment, the method, in a receiver, comprises obtaining a plurality of correlation values. The method also comprises identifying a largest correlation value. The method also comprises identifying a next largest correlation value. The method also comprises comparing the next largest correlation value to a threshold. The method also comprises determining a coarse symbol timing value, wherein the determining the coarse symbol timing comprises, in response to the next largest correlation value exceeding the threshold, determining the coarse symbol timing value based on both the largest correlation value and the next largest correlation value, and, in response to the next largest correlation value not exceeding the threshold, determining the coarse symbol timing value based on the largest correlation value, and, in response to determining the coarse symbol timing value, receiving, by the receiver, a signal.

In accordance with at least one embodiment, the determining the coarse symbol timing value further comprises initializing a stored adjusted peak value to be equal to an initial current adjusted peak value. In accordance with at least one embodiment, the determining the coarse symbol timing value further comprises determining whether a current adjusted peak value is greater than or equal to a stored adjusted peak value for a current preamble detection operation. In accordance with at least one embodiment, the method further comprises limiting a time allowed for refining a coarse timing estimate to a time limit, wherein, when the time limit is reached, a current stored adjusted peak value is used to determine the coarse symbol timing value.

The concepts of the present disclosure have been described above with reference to specific embodiments. However, one of ordinary skill in the art will appreciate that various modifications and changes can be made without departing from the scope of the present disclosure as set forth in the claims below. In particular, the total number of comparator taps, the numbers of comparator taps allocated to designated functions, the manner of combination of the outputs of the comparator taps, the manner in which the comparator taps are instantiated, the number of timing and CFO candidates, and other attributes described above may be varied according to different embodiments. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, in a receiver, comprising:

obtaining a coarse timing value according to a peak correlation value and a next largest correlation value;

receiving a plurality of correlation values corresponding to a plurality of frequency-shifted versions of a reference waveform and a plurality of carrier frequency offset (CFO) candidate values according to a timing range of timing values including the coarse timing value;

including as selected correlation values the correlation values above a threshold;

obtaining a CFO estimate as a weighted average of frequencies of the CFO candidate values represented by the correlation values; and receiving payload data of a signal according to the CFO estimate.

2. The method of claim 1 wherein the including as the selected correlation values the correlation values above the threshold comprises:

setting the threshold in relation to the peak correlation value.

3. The method of claim 1 wherein time indexed samples of the reference waveform comprise representations of the plurality of frequency-shifted versions, wherein each of the frequency-shifted versions is shifted according to a corresponding one of the plurality of CFO candidate values.

4. The method of claim 1 wherein the signal is modulated with continuous phase frequency shift keying.

5. The method of claim 1 wherein the signal includes a preamble with a segment used as a signature waveform for acquiring the signal by the receiver.

6. The method of claim 1 wherein the plurality of CFO candidate values correspond to a set of equally spaced CFO values.

7. The method of claim 6, further comprising matching correlators of a bank of correlators or correlator taps with the spaced CFO values to correlate the spaced CFO values with the plurality of CFO candidate values.

8. The method of claim 1 wherein the CFO estimate may be calculated by the equation:

$$f_{offset} = \frac{\sum_{k=0}^{7} h_k f_k}{\sum_{k=0}^{7} h_k},$$

where $f_k$ represents CFO candidate values, and
$h_k$ represents a number of elements.

9. A method, in a receiver, comprising:
obtaining a plurality of correlation values;
identifying a largest correlation value;
identifying a next largest correlation value;
comparing the next largest correlation value to a threshold;
determining a coarse symbol timing value, wherein the determining the coarse symbol timing comprises:
in response to the next largest correlation value exceeding the threshold, determining the coarse symbol timing value based on both the largest correlation value and the next largest correlation value; and
in response to the next largest correlation value not exceeding the threshold, determining the coarse symbol timing value based on the largest correlation value; and
in response to determining the coarse symbol timing value, receiving and demodulating, by the receiver, a signal using the coarse symbol timing value to obtain payload data of the signal.

10. The method of claim 9 wherein the determining the coarse symbol timing value further comprises:
initializing a stored adjusted peak value to be equal to an initial current adjusted peak value.

11. The method of claim 9 wherein the determining the coarse symbol timing value further comprises:
determining whether a current adjusted peak value is greater than or equal to a stored adjusted peak value for a current preamble detection operation.

12. The method of claim 9 further comprising:
limiting a time allowed for refining a coarse timing estimate to a time limit, wherein, when the time limit is reached, a current stored adjusted peak value is used to determine the coarse symbol timing value.

13. A receiver device comprising a bank of correlators, with each correlator of the bank of correlators matched to a carrier frequency offset (CFO) value of a set of equally spaced CFO values, the receiver device configured to:
obtain a coarse timing value according to a peak correlation value and a next largest correlation value;
receive a plurality of correlation values corresponding to a plurality of frequency-shifted versions of a reference waveform and a plurality of CFO candidate values according to a timing range of timing values including the coarse timing value;
include as selected correlation values the correlation values above a threshold;
obtain a CFO estimate as a weighted average of frequencies of the CFO candidate values represented by the correlation values;
receive a signal according to the CFO estimate; and
demodulate the received signal to obtain payload data of the signal.

14. The receiver device of claim 13 wherein the receiver device to include as the selected correlation values the correlation values above the threshold further comprises:
the receiver device to set the threshold in relation to the peak correlation value.

15. The receiver device of claim 13 wherein time indexed samples of the reference waveform comprise representations of the plurality of frequency-shifted versions,
wherein each of the frequency-shifted versions is shifted according to a corresponding one of the plurality of CFO candidate values.

16. The receiver device of claim 13 wherein CFO values of the set of equally spaced CFO values correspond to respective CFO candidate values of the plurality of CFO candidate values.

* * * * *